US009471848B2

United States Patent
Horiuchi et al.

(10) Patent No.: US 9,471,848 B2
(45) Date of Patent: Oct. 18, 2016

(54) CLASSIFYING OBJECTS DISPLAYED ON A DEVICE

(71) Applicant: INTERNATIONAL BUSINESS MACHINES CORPORATION, Armonk, NY (US)

(72) Inventors: Yoshio Horiuchi, Hiratsuka (JP); Harumi Itoh, Machida (JP); Tadahiko Nakamura, Yokohama (JP); Masato Suzuki, Warabi (JP)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 14/220,795

(22) Filed: Mar. 20, 2014

(65) Prior Publication Data

US 2014/0286581 A1    Sep. 25, 2014

(30) Foreign Application Priority Data

Mar. 25, 2013 (JP) .................. 2013-061312

(51) Int. Cl.

| | |
|---|---|
| *G06K 9/62* | (2006.01) |
| *G06F 3/0481* | (2013.01) |
| *G06F 3/0484* | (2013.01) |
| *G06F 3/0486* | (2013.01) |
| *G06F 9/44* | (2006.01) |

(52) U.S. Cl.
CPC ........... *G06K 9/6253* (2013.01); *G06F 3/0481* (2013.01); *G06F 3/0484* (2013.01); *G06F 3/0486* (2013.01); *G06F 3/04842* (2013.01); *G06F 9/4443* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 2005/0108620 A1 | 5/2005 | Allyn et al. | |
| 2008/0298766 A1* | 12/2008 | Wen et al. | ...................... 386/46 |
| 2009/0293008 A1 | 11/2009 | Fujii et al. | |
| 2010/0135584 A1* | 6/2010 | Tang et al. | ................... 382/218 |
| 2012/0213433 A1 | 8/2012 | Shimizawa et al. | |
| 2014/0286543 A1* | 9/2014 | Nagaoka | ........... G06F 17/30247 382/118 |

FOREIGN PATENT DOCUMENTS

| | | | |
|---|---|---|---|
| JP | H08212042 A | 8/1996 | |
| JP | H11219369 A | 8/1999 | |
| JP | 2005149512 A | 6/2005 | |
| JP | 2005221707 A | 8/2005 | |
| JP | 2007328456 A | 12/2007 | |
| JP | 2008027397 A | 2/2008 | |
| JP | 2010009426 A | 1/2010 | |
| JP | 2011141748 A | 7/2011 | |

* cited by examiner

*Primary Examiner* — Brian P Werner
(74) *Attorney, Agent, or Firm* — Law Office of Jim Boice

(57) ABSTRACT

A method, system, and/or computer program product classifies a plurality of objects displayed on a display device and displays the classified plurality of objects. The method comprises: selecting one object from a plurality of objects as a selected object; and classifying the plurality of objects, where classification of each of the plurality of objects is based on a degree of association with the selected object. Classifying the plurality of objects comprises: reading a feature setting for computation of the degree of association; specifying a plurality of features that are subject to the computation of the degree of association; computing, for each of the plurality of objects, the degree of association based on a difference in feature value from the selected object with regard to the plurality of features; and dividing the plurality of objects into a plurality of groups, where each group is based on the degree of association.

17 Claims, 10 Drawing Sheets

CLASSIFYING OBJECTS DISPLAYED ON A DEVICE

This application is based on and claims the benefit of priority from Japan (JP) Patent Application 2013-061312, filed on Mar. 25, 2013, and herein incorporated by reference in its entirety.

BACKGROUND

The present invention relates to a method, apparatus, and computer program for classifying a plurality of objects.

In recent years, there is an increasing tendency to use a larger amount of presentation data. The number of materials or components constituting the data increases with the increase in amount of the data. Moreover, these material objects have a plurality of types such as text, image, and graphics. A process of selecting desired objects from display of a large number of such materials and combining the selected objects is extremely difficult.

This creates a demand for a technique of temporarily grouping a plurality of objects according to some criterion and selecting desired objects from the grouped objects. Certain prior art discloses that a plurality of objects are grouped by weighting each object according to keyword. Other prior art discloses that images are grouped by computing the distances between the images from positional information and performing threshold determination.

However, the prior art does not provide an intuitively excellent object grouping method and object selection method by applying various classification criteria.

SUMMARY

A method, system, and/or computer program product classifies a plurality of objects displayed on a display device and displays the classified plurality of objects. The method comprises: selecting one object from a plurality of objects as a selected object; and classifying the plurality of objects, where classification of each of the plurality of objects is based on a degree of association with the selected object. Classifying the plurality of objects comprises: reading a feature setting for computation of the degree of association; specifying a plurality of features that are subject to the computation of the degree of association; computing, for each of the plurality of objects, the degree of association based on a difference in feature value from the selected object with regard to the plurality of features; and dividing the plurality of objects into a plurality of groups, where each group is based on the degree of association.

DETAILED DESCRIPTION

Figure 1:
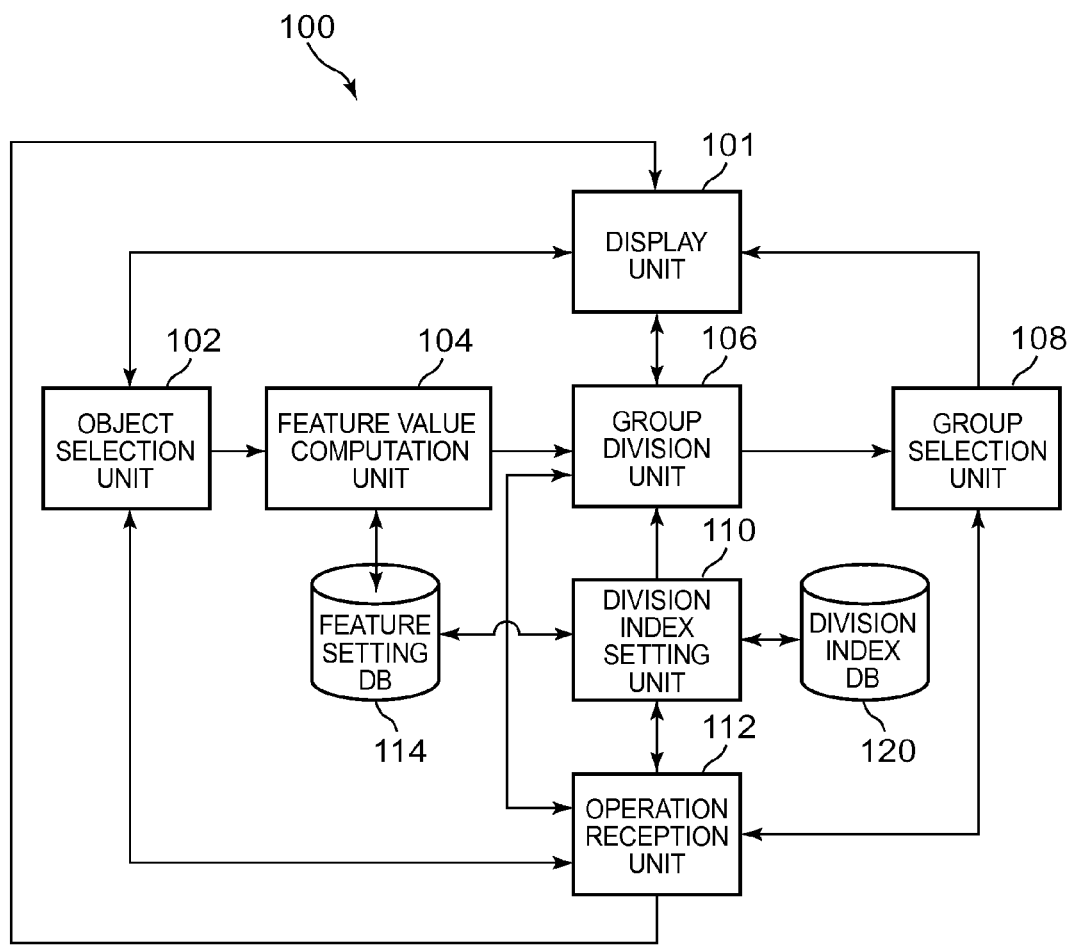
FIG. 1 is a block diagram relating to an apparatus according to the present invention.
Figure 2:
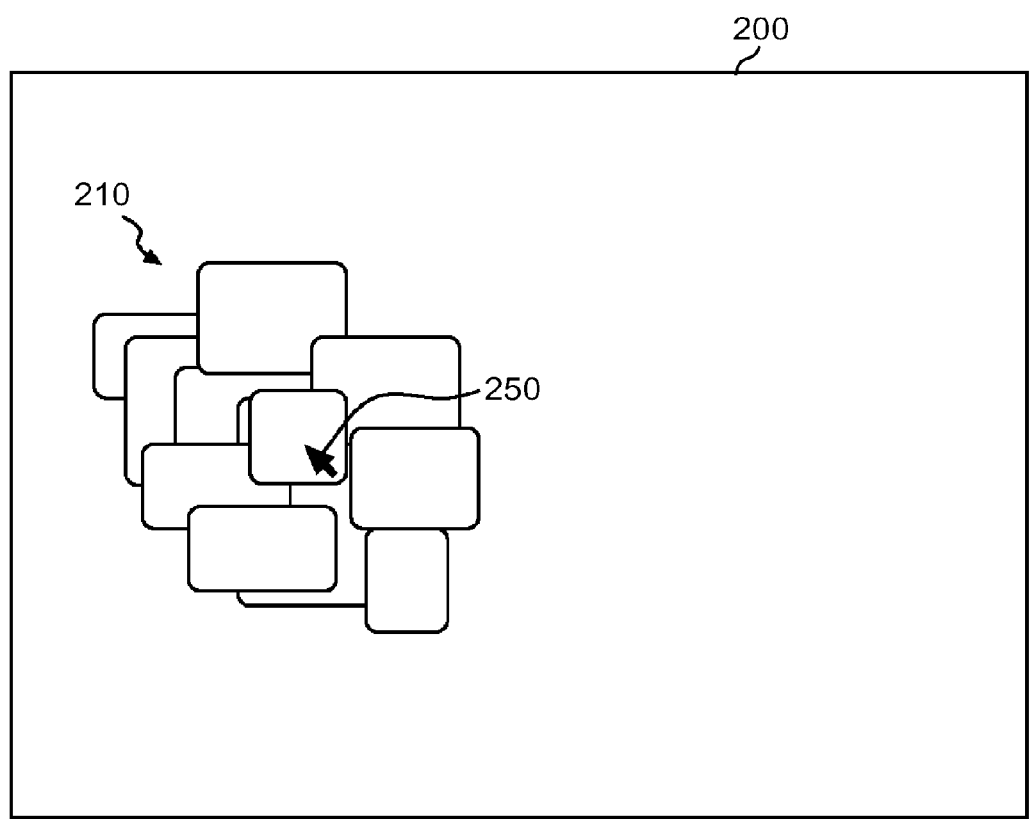
FIG. 2 is a diagram for describing a method of dividing a plurality of objects according to the present invention.

FIG. 1 is a block diagram schematically showing an apparatus 100 according to the present invention. A display unit 101 displays various objects on a display device 200. The display unit 101 also displays a pointer via an operation reception unit 112 for receiving a pointer operation by a user. When the user moves the pointer to a desired point and presses a selection button by, for example, clicking a left mouse button, an object selection unit 102 selects an object closest to the clicked point. Here, an object whose center is closest to the clicked point is determined as the selected object. Alternatively, an object displayed at the clicked point may be determined as the selected object. Once the selected object has been determined, a feature value computation unit 104 computes a feature value of the selected object based on feature contents recorded in a feature setting DB 114.

Computing a feature value means to compute a value of an object with regard to a preset category representing a feature of the object. Examples of the feature of the object include a type (text, image, graphics, etc.) of the object, a creation date and time of the object, a display attribute (color, layer, shade, etc.) of the object, and a display area of the object.

After the computation of the feature value of the selected object ends, a group division unit 106 groups the objects. This grouping is performed based on, for each of the displayed objects, to what extent the object is different in feature value from the selected object.

Preferably, once the selection operation has been performed by the user and the selected object has been determined, the group division unit 106 computes a feature value of each object, finds its difference from the feature value of the selected object, and divides the objects into groups.

Each feature value of the object to be computed is recorded in the feature setting DB 114. A GUI that enables feature value selection and setting/adjustment is preferably provided to the user.

The group division is executed based on a division index set by a division index setting unit 110. The division index is recorded in a division index DB 120, and the user is preferably allowed to edit a threshold as the index through a GUI according to need.

The objects divided into groups may be displayed with different display attributes depending on group. A group region is created for each group, and the group of objects is displayed in the region. The user can select a desired object from a specific group. The user may also select a specific group itself to thereby select all objects included in the group.

In a more preferable operating mode for the group division method, in response to the user moving the selected object in a state where the object is selected by the pointer, the plurality of objects are gradually grouped according to their differences in feature value from the selected object. Visually and ergonomically excellent object grouping can be achieved in this way. The moving direction may be one of the horizontal direction and the vertical direction. The grouping may be initiated by the user performing an operation of horizontally swinging the pointer (sifting) in a state where the object is selected.

More detailed operating modes according to the present invention are described with reference to FIG. 2 to FIG. 6. First, in FIG. 2, a set of a plurality of objects 210 is displayed on the display device 200. The user moves a pointer 250 and presses the selection button at a desired position. Though the use of the pointer 250 of a pointing device such as a mouse is assumed here, an object itself may be selected with a cursor and the like. In the case where the display device 200 includes a touch panel, an object may be selected with the user's finger or a stick.

Figure 3:
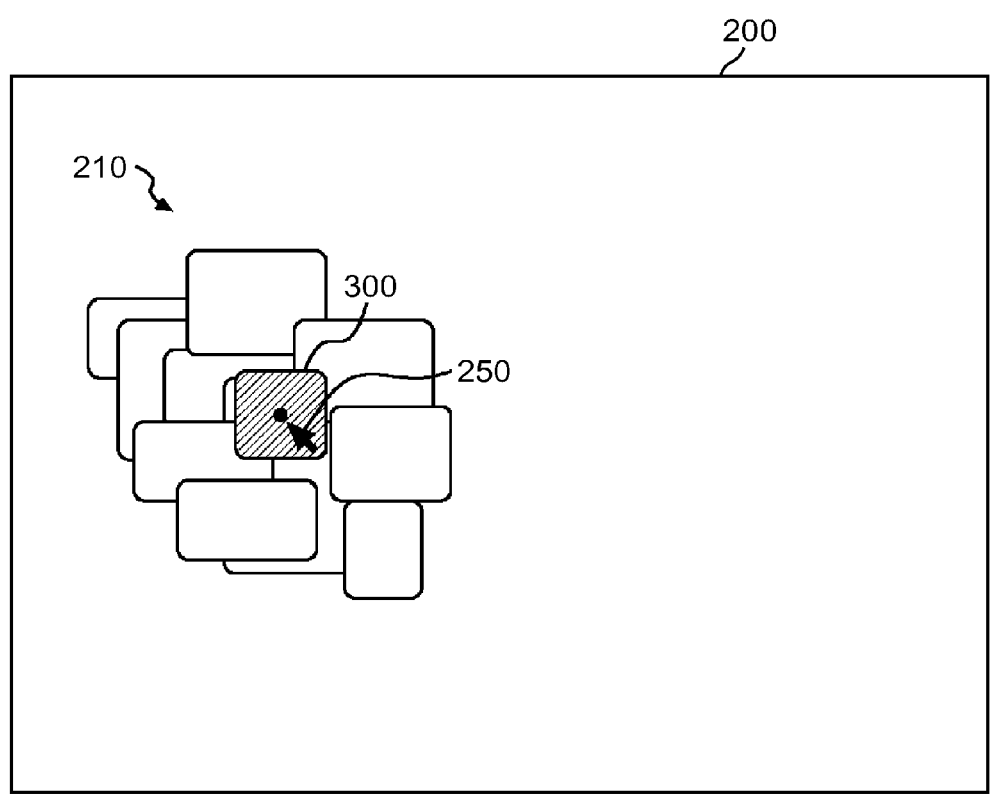
FIG. 3 is a diagram for describing a method of dividing a plurality of objects according to the present invention.

In FIG. 3, when the user places the pointer 250 at an arbitrary point on the object set which is subject to grouping and performs a selection operation (typically a click operation), an object 300 whose center is closest to the clicked point is selected. Alternatively, an object including the clicked point may be selected from the displayed object set. The feature value of the selected object is then computed. The feature value is computed based on each of a plurality of features and their details recorded in the feature setting DB 114. The user is allowed to select/adjust the plurality of features at any time.

Figure 4:
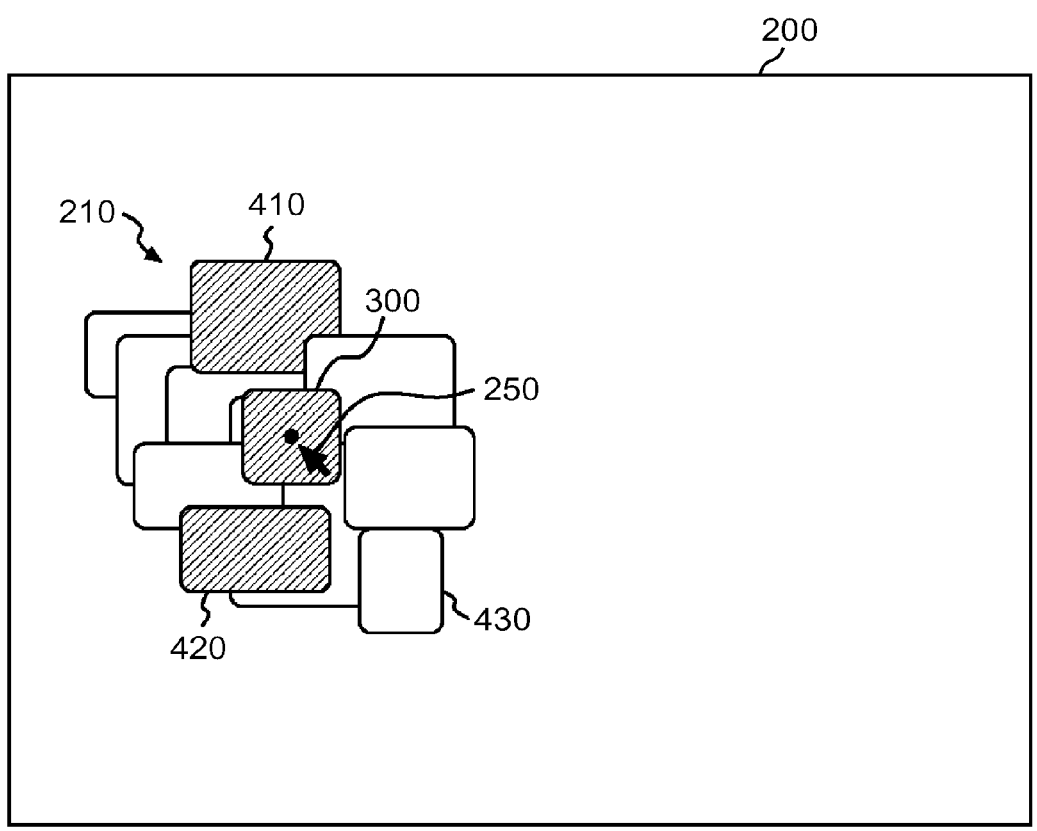
FIG. 4 is a diagram for describing a method of dividing a plurality of objects according to the present invention.

FIG. 4 shows an operating mode according to the present invention. Once the selected object has been determined, each object whose difference in feature value from the selected object is within a predetermined range, i.e. each object close to the selected object according to a classification criterion, is computed from the object set.

In the example in FIG. 4, objects 410 and 420 correspond to such objects. These objects are preferably displayed with their display attribute changed as approximate objects. Here, the objects 410 and 420 with a small difference in feature value are determined to approximate to the selected object according to a predetermined index, i.e. determined to have a high degree of association with the selected object. Meanwhile, an object 430 is assumed to be an object with a medium degree of association.

In the stage in FIG. 4, the objects (the objects 410 and 420 in FIG. 4) with a high degree of association with the selected object at the clicked point may be automatically selected as a provisional operation target.

Figure 5A:
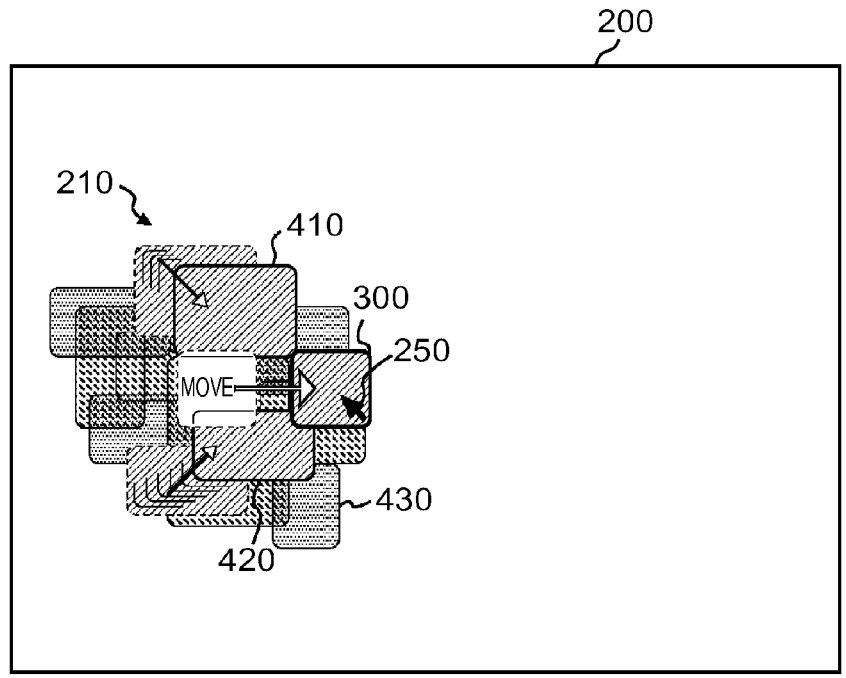
FIG. 5A and FIG. 5B depict diagrams for describing a method of dividing a plurality of objects according to the present invention.
Figure 5B:
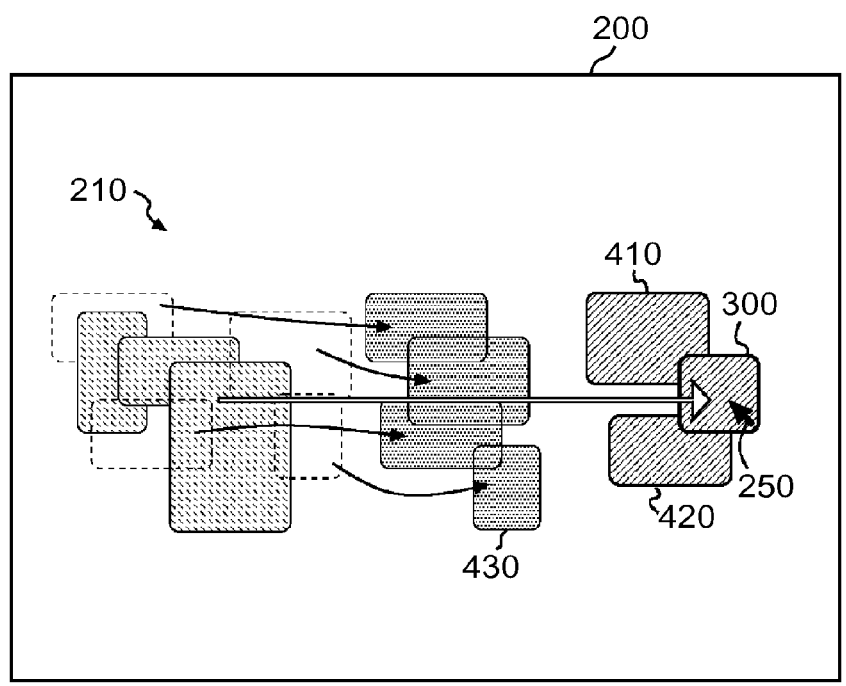

FIG. 5A and FIG. 5B shows another operating mode according to the present invention.

FIG. 5A shows a mode in which, once the selected object has been determined, the object set is divided into a plurality of groups according to their differences in feature value from the selected object. The objects are preferably displayed with different display attributes depending on group. The display in this state is, however, not clear because the groups are overlapped and mixed up with each other. Therefore, the object 300 is moved to the right in the selected state.

FIG. 5B shows a mode in which the user moves the pointer 250 to the right in the state of selecting the selected object 300. Here, the display is made so that the groups are gradually separated from each other with the movement of the selected object. The objects in the groups are moved in such a manner that a group with a high degree of association with the selected object is close to the selected object and a group with a low degree of association with the selected object is far from the selected object.

The operating mode of such movement can be realized by changing the moving speed of each object according to its degree of association with the selected object. In detail, an object with a high degree of association is moved at high speed, whereas an object with a low degree of association is moved at low speed. The same advantageous effects can be achieved by specifying the speed of each group beforehand. As a result, the objects 410 and 420 are displayed in close vicinity of the selected object 300, while the object 430 has been moved to about a medium distance from the selected object 300.

Figure 6:
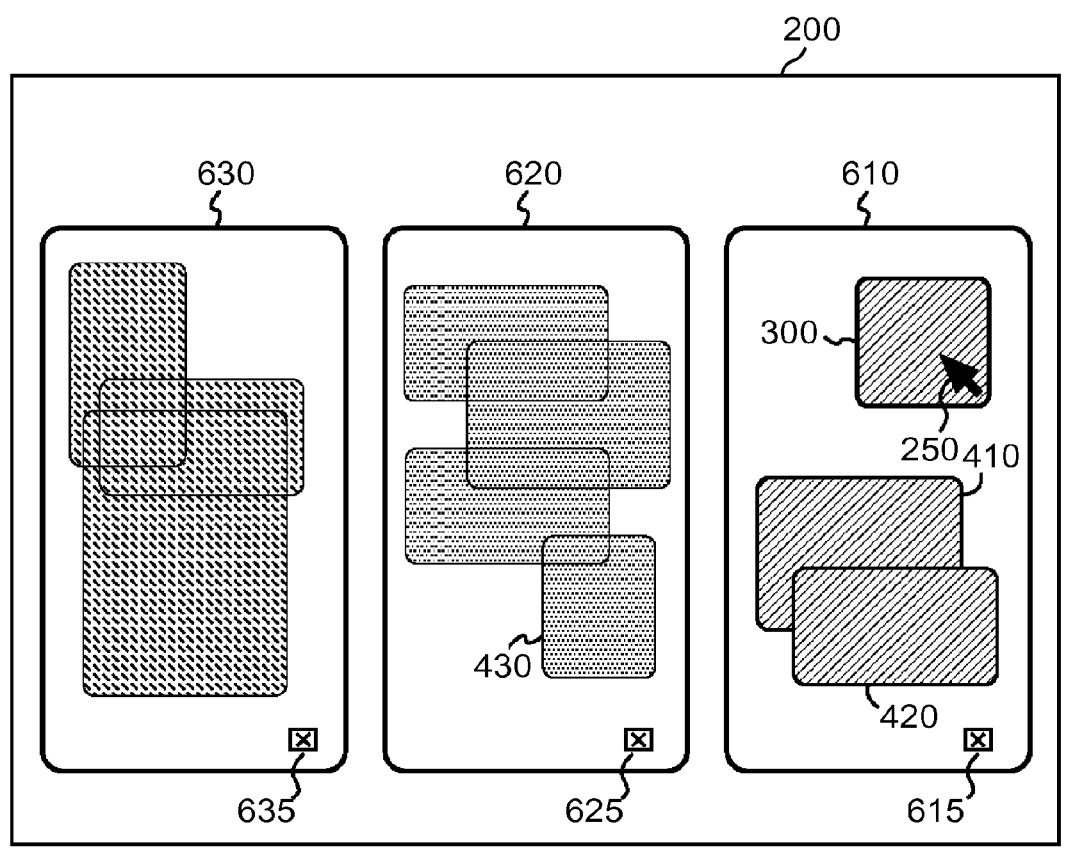
FIG. 6 is a diagram for describing a method of dividing a plurality of objects according to the present invention.

FIG. 6 shows a grouping state when the movement is completed. In FIG. 6, each group is displayed in a separate region upon the movement end. The objects 410 and 420 with the highest degree of association with the selected object 300 are organized as a group 610. The objects with the next highest degree of association with the selected object 300 are organized as a group 620. The objects with the low degree of association with the selected object 300 are organized as a group 630. The user can move the pointer 250 and select an object necessary as data from the classified objects.

Preferably, checkboxes 615, 625, and 635 may be provided at the bottom right of the group regions in FIG. 6 so that choosing any of the checkboxes enables the entire group to be excluded from the operation target or selected.

Though the plurality of objects are gradually moved with the movement of the selected object 300 in the above-mentioned operating mode, the final group division state in FIG. 6 may be displayed when the selected object 300 is determined.

Figure 7:
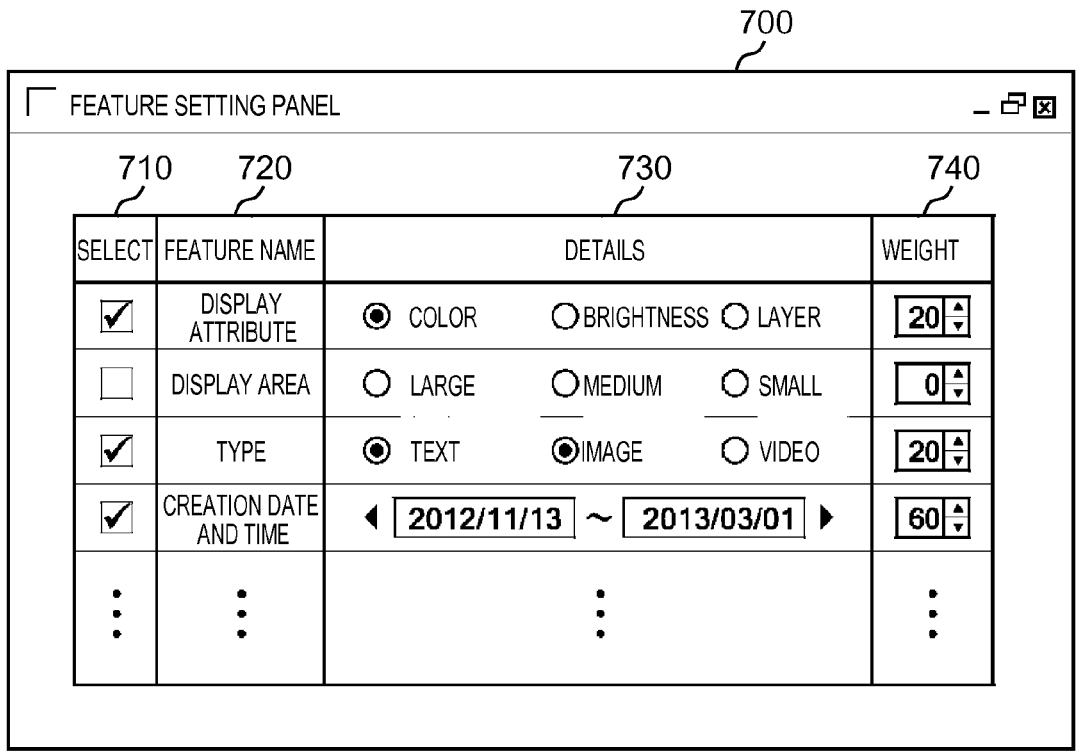
FIG. 7 is a diagram of an example of a feature setting panel.

FIG. 7 shows an example of a feature setting panel. This panel provides a GUI for changing the feature names and details recorded in the feature setting DB 114. A feature setting panel 700 can be popup displayed on the display device 200 according to need by pressing a specific key, and the user is allowed to change its contents. The feature contents are merely illustrative, and various changes and additions are applicable.

The feature setting panel 700 includes columns of a feature selection checkbox, a feature name, feature details, and a weight. The weight is expressed as a percentage, and the sum of all weights equals 100%.

In the example in FIG. 7, the display attribute, the type, and the creation date and time are selected as the features that are subject to feature value computation, by checking the corresponding selection checkboxes. The creation date and time is given a highest weight of 60 in the example in FIG. 7, indicating that the objects are classified with importance being placed on the creation date and time. Note that the degree of association when all selected features are combined together is based on a 100-point scale. The distance from the selected object may also be used as a feature, though not shown in FIG. 7.

First, the feature value of the selected object is computed for each of the features whose selection checkboxes are checked. Next, the feature value of each of the other objects is equally computed. The final degree of association of each object is obtained by multiplying the result of computing the difference in feature value by the corresponding weight and summing the products for all features.

In FIG. 7, the display attribute includes color, brightness, and layer. Since the color is currently selected, the degree of association is computed depending on to what extent the object is close in color to the selected object. If the object has the completely same color as the selected object, that is, if the difference in color (RGB value) is 0, the score with regard to the color feature is 20.

The display area includes large, medium, and small. The display area is divided into three levels, depending on whether the object area is large or small based on a maximum area and a minimum area of the plurality of objects. In the case where no checkmark is placed on any of these levels, the closeness in area to the selected object is taken into account. In the example in FIG. 7, the selection checkbox is not checked, and so the display area is not used for computing the degree of association.

The type includes text, image, video, and graphics (not shown). Suppose the selected object is a text object. In the case where the target object is a text or image object, there is no difference, so that the score is 20. Though a checkmark is placed on the type (text) of the selected object in default, this is changeable by the user according to need. In the example in FIG. 7, a checkmark is additionally placed on the image.

The creation date and time can be designated in range. In the case where this field is blank, an object close in creation date and time to the selected object (i.e. with no time difference) is determined to have a high degree of association. The score of an object whose creation date and time matches the designated condition is 60.

Lastly, the scores of the features whose selection checkboxes are checked are summed to compute the degree of association of the target object.

Figure 8:
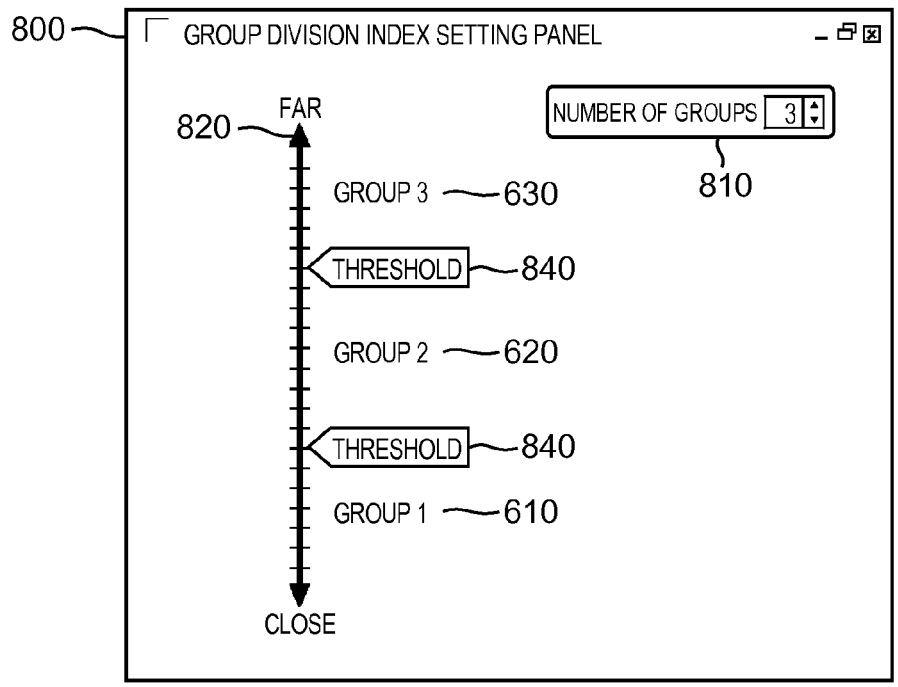
FIG. 8 is a diagram of an example of a group division index setting panel.

FIG. 8 shows an example of a group division index setting panel. This panel provides a GUI for changing the number of groups and their index recorded in the division index DB 120. A maximum number of groups is set in a group number selection region 810. In the example in FIG. 8, "3" is set in the group number selection region 810. A scale 820 indicates the degree of association with the selected object. Objects in closer relations (with higher degrees of association) with the selected object correspond to lower levels on the scale, and objects in farther relations (with lower degrees of association) with the selected object correspond to upper levels on the scale.

Two threshold bars 840 are displayed to divide the plurality of objects into three groups on the scale. These threshold bars are adjustable up and down according to need, using the mouse and the like. In the case where the number of groups is 4, three threshold bars are displayed.

Figure 9:
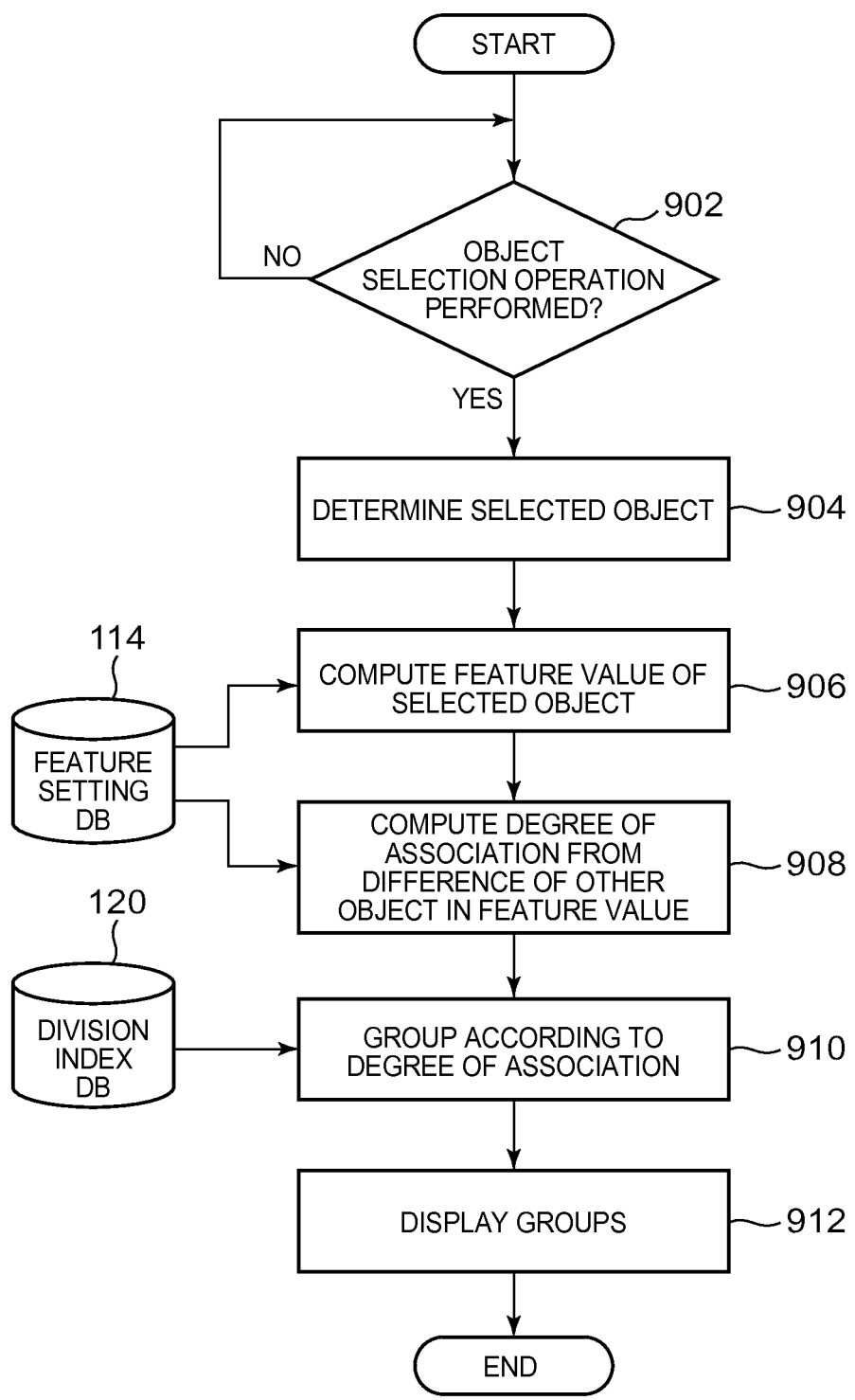
FIG. 9 is a flowchart according to the present invention.

FIG. 9 is a flowchart according to the present invention. First, in step 902, whether or not the user performs an object selection operation is determined. In the case where the selection operation (e.g. click the left mouse button) is performed, the selected object is determined in step 904. In step 904, an object whose center is closest to the position designated by the user is set as the selected object. Alternatively, an object including the designated position may be set as the selected object.

Next, in step 906, the feature value of the selected object is computed. The feature setting is read from the feature setting DB 114, and the feature value of the selected object is computed for each feature that is subject to computation. Following this, in step 908, the feature value of each of the other objects is equally computed. The difference from the selected object is then computed for each feature value, the computed difference is multiplied by the weight to obtain the score, and the sum of the scores is set as the degree of association.

Next, in step 910, the plurality of objects are grouped. The division index is read from the division index DB, and the plurality of objects are divided into groups according to their degrees of association with the selected object.

Lastly, in step 912, the groups obtained as a result of the division are displayed in separate regions. Though the computation of the feature values of the selected object and the computation of the feature values of each of the other objects are separately performed and the differences are summed as the degree of association in FIG. 9, a method in which the difference in feature value between the selected object and each of the other objects is computed for each feature value simultaneously and the differences are summed is also applicable.

Figure 10:
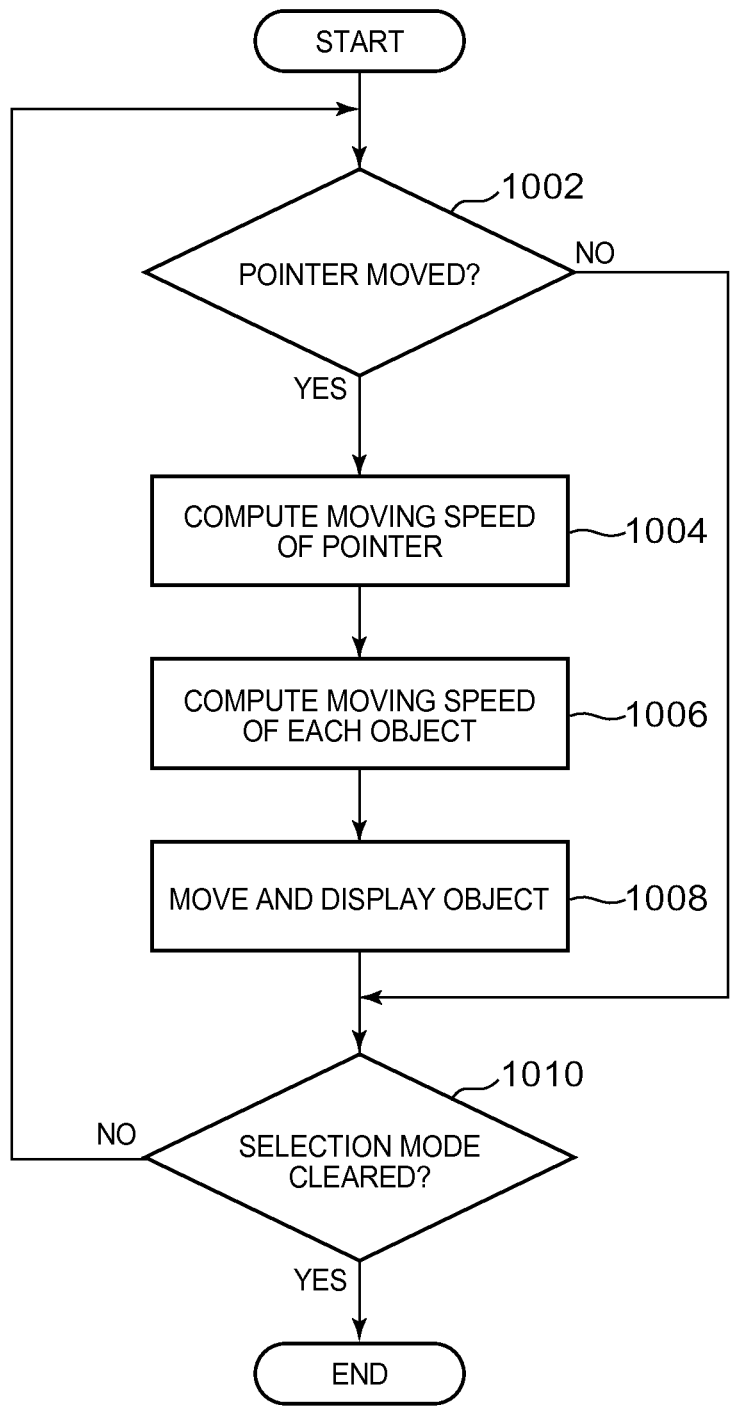
FIG. 10 is a detailed flowchart of grouping.

FIG. 10 is a more detailed flowchart of step 910 for grouping. It is assumed here that the selected object has been determined and is in the selected state. First, in step 1002, whether or not the pointer is moved is determined. In the case where the pointer is moved, the moving speed of the pointer (the moving speed of the selected object) is computed.

Next, in step 1006, the moving speed of each object is computed according to the degree of association of the object. For example, in the case where the object has a degree of association of 50, its moving speed is computed as "(the moving speed of the selected object)×50/100".

In step 1008, the object is moved according to the moving speed and displayed. Lastly, whether or not the group division ends (whether or not the selection mode is cleared) is determined, and then the overall procedure ends. Note that the procedure may be suspended by pressing a specific key (e.g. ESC key) in a period from when the selected object is determined to before the group division process ends.

Figure 11:
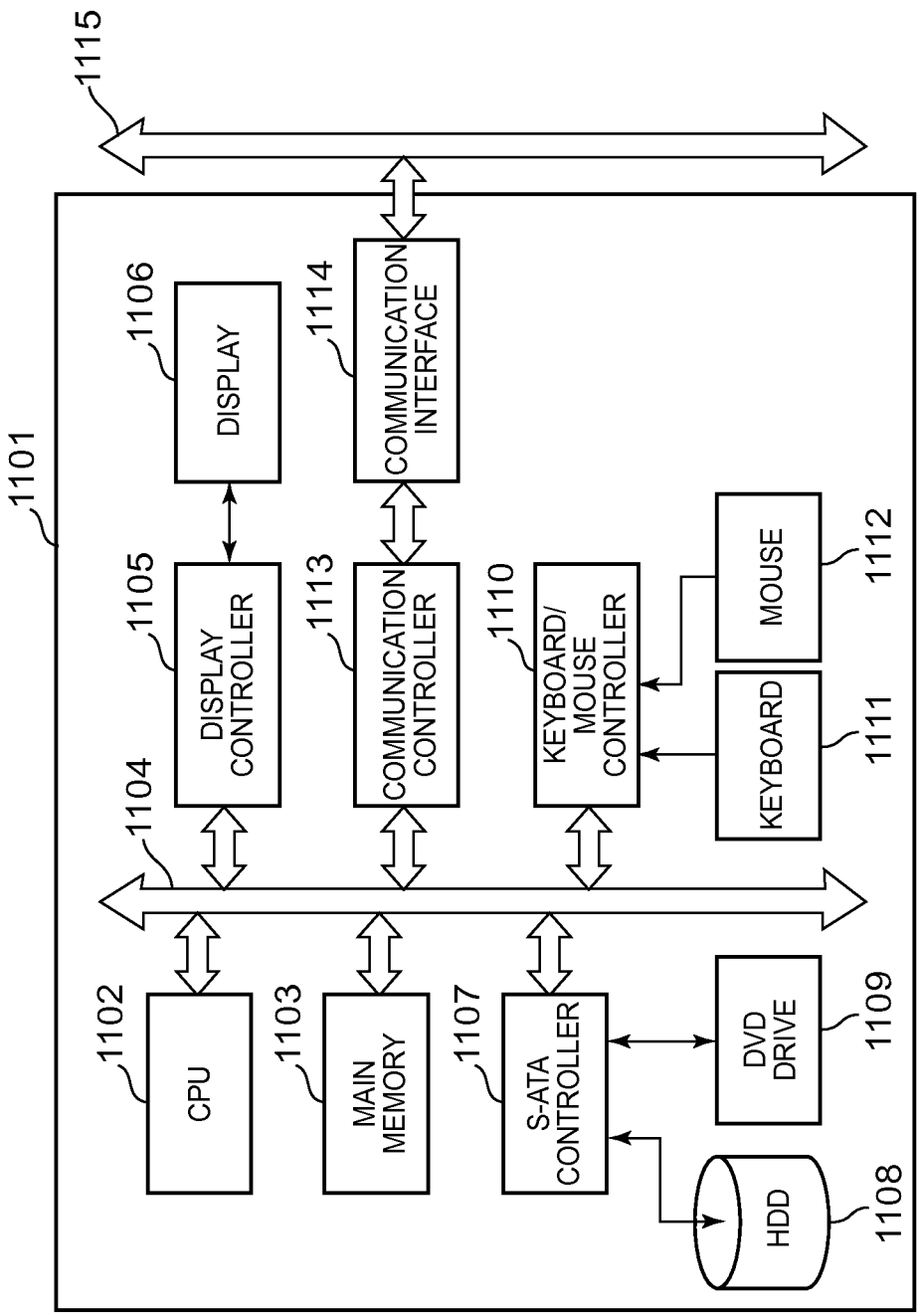
FIG. 11 is a block diagram of computer hardware used for the present invention as an example.

FIG. 11 is a block diagram of computer hardware used for the object classification and display apparatus according to the present invention, as an example. A computer apparatus (1101) includes a CPU (1102) and a main memory (1103), which are connected to a bus (1104). The CPU (1102) may be any of zSeries™, PowerPC™, and other 32-bit or 64-bit architecture-based CPUs such as Intel Corporation's Xeon™ series, Core™ series, Atom™ series, Pentium™ series, and Celeron™ series, AMD's Phenom™ series, Athlon™ series, Turion™ series, and Sempron™, and the like.

A display (1106) that corresponds to the display device 200 such as an LCD monitor is connected to the bus (1104) via a display controller (1105). The display (1106) is used not only for display of an OS and applications but also for display of the object set, the pointer, the feature setting panel, and the group division index setting panel according to the present invention.

In the case where the display (1106) has a touch panel function, input information is signal-processed via a keyboard/mouse controller (1110).

Moreover, a hard disk (1108) or a silicon disk, a CD-ROM, DVD, or Blu-ray drive (1109), and the like are connected to the bus (1104) via a storage device controller (1107).

The feature setting DB, the division index DB, and a GUI program for editing these DBs are stored in the hard disk (1108). An application program and OS for monitoring and receiving user operations are also stored in the hard disk (1108). The program and the data are preferably loaded from the hard disk (1108) into the main memory (1103) and executed by the CPU (1102).

Furthermore, a keyboard (1111) and a mouse (1112) are connected to the bus (1104) via the keyboard/mouse controller (1110), and used for selecting and moving an object according to the present invention.

An object of the present invention is to provide a method for grouping objects by flexibly and appropriately setting various classification criteria for objects.

Another object of the present invention is to provide an object classification method that is excellent in usability and ergonomics with use of a GUI.

Yet another object of the present invention is to provide a method for selecting desired objects from classification groups.

Thus, as described herein, the present invention provides a method for classifying a plurality of objects displayed on a display device and displaying the classified plurality of objects by processing by a computer, the method including the steps of: selecting one object as a selected object, in response to a user performing an object selection operation; and classifying the plurality of objects, each based on a degree of association with the selected object, wherein the step of classifying includes the steps of: reading a feature setting for computation of the degree of association, and specifying a plurality of features that are subject to the computation of the degree of association; computing, for each of the plurality of objects, the degree of association from a difference in feature value from the selected object with regard to the plurality of features; and dividing the plurality of objects into a plurality of groups, each based on the degree of association.

In one embodiment, the step of selecting selects, as the selected object, an object whose center is closest to a position selected by the user.

In one embodiment, the step of selecting selects, as the selected object, an object displayed at a position selected by the user.

In one embodiment, the plurality of features include any of a creation date and time of an object, a display attribute of the object, an area of the object, a type of the object, and a distance of the object from the selected object.

In one embodiment, the type is text, image, or graphics.

In one embodiment, the step of dividing into the plurality of groups classifies the plurality of objects in response to the user moving the selected object.

In one embodiment, the method further includes the step of enabling the user to designate which feature value is to be computed for feature value computation.

In one embodiment, the step of dividing into the plurality of groups includes the step of enabling the user to set the number of groups and a division index for group division.

In one embodiment, the method lastly includes the step of displaying a group region and an object for each of the plurality of groups.

As another aspect, the present invention provides an apparatus for classifying a plurality of objects displayed on a display device and displaying the classified plurality of objects by processing by a computer, the apparatus including: means for selecting one object as a selected object, in response to a user performing an object selection operation; and means for classifying the plurality of objects, each based on a degree of association with the selected object, wherein the means for classifying includes: means for reading a feature setting for computation of the degree of association, and specifying a plurality of features that are subject to the computation of the degree of association; means for computing, for each of the plurality of objects, the degree of association from a difference in feature value from the selected object with regard to the plurality of features; and means for dividing the plurality of objects into a plurality of groups, each based on the degree of association.

As another aspect, the present invention provides a computer program for causing a computer to execute the steps in the method described above.

As another aspect, the present invention provides a computer-readable recording medium in which the computer program described above is recorded.

According to the present invention, it is possible to group objects by flexibly and appropriately setting various classification criteria. It is also possible to provide an object classification method that is excellent in ergonomics. It is further possible to select desired objects from final classification groups.

The object classification method according to the present invention can be realized by an apparatus-executable program written in an object-oriented programming language such as C++, Java®, Java® Beans, Java® Applet, Java® Script, Perl, or Ruby, a database language such as SQL, or the like. The program may be distributed by being stored in a computer-readable recording medium or by being transmitted.

Although the present invention has been described by way of a specific embodiment and examples, the present invention is not limited to the specific embodiment and examples. Any modifications such as other embodiments, additions, changes, and deletions can be made within the range conceivable by those skilled in the art, and all aspects are included in the scope of the present invention so long as the operations and effects of the present invention are achieved.

What is claimed is:

1. A method for classifying a plurality of objects displayed on a display device and displaying the classified plurality of objects, the method comprising:

selecting, by one or more processors, one object from a plurality of objects displayed on a display device as a selected object, wherein said selecting is performed in response to a user performing an object selection operation, and classifying, by one or more processors, the plurality of objects, wherein classification of each of the plurality of objects is based on a degree of association with the selected object, and wherein said classifying the plurality of objects comprises:

reading, by one or more processors, a feature setting for computation of the degree of association;

specifying, by one or more processors, a plurality of features that are subject to the computation of the degree of association, wherein the plurality of features includes a creation date and time of an object, a display attribute of the object, an area of the object, a type of the object, and a distance of the object from the selected object;

computing, by one or more processors and for each of the plurality of objects, the degree of association based on a difference in feature value from the selected object with regard to the plurality of features; and dividing, by one or more processors, the plurality of objects into a plurality of groups, wherein each group from the plurality of groups is based on the degree of association;

weighting, by one or more processors, each of the plurality of features; and displaying, by one or more processors, each of the plurality of groups at a different position on the display device according to the degree of association of the selected object to the plurality of objects based on weightings of the plurality of features.

2. The method according to claim 1, wherein said selecting selects, as the selected object, an object whose center on a display is closest to a position selected by the user.

3. The method according to claim 1, wherein said selecting selects, as the selected object, an object displayed at a position selected by the user.

4. The method according to claim 1, wherein the type is text, image, or graphics.

5. The method according to claim 1, wherein said dividing the plurality of objects into the plurality of groups classifies the plurality of objects in response to the user moving the selected object.

6. The method according to claim 1, further comprising:
enabling, by one or more processors, the user to designate which feature value is to be computed for in a feature value computation.

7. The method according to claim 1, wherein said dividing into the plurality of groups comprises:
enabling, by one or more processors, the user to set a number of groups and a division index for group division.

8. The method according to claim 1, further comprising:
displaying, by one or more processors, a group region and an object for each of the plurality of groups.

9. A computer program product for classifying a plurality of objects displayed on a display device and displaying the classified plurality of objects, the computer program product comprising a non-transitory computer readable storage medium having program code embodied therewith, the program code readable and executable by a processor to perform a method comprising:
selecting one object from a plurality of objects displayed on a display device as a selected object, wherein said selecting is performed in response to a user performing an object selection operation; and
classifying the plurality of objects, wherein classification of each of the plurality of objects is based on a degree of association with the selected object, and wherein said classifying the plurality of objects comprises:
reading a feature setting for computation of the degree of association;
specifying a plurality of features that are subject to the computation of the degree of association, wherein the plurality of features includes a creation date and time of an object, a display attribute of the object, an area of the object, a type of the object, and a distance of the object from the selected object;
computing, for each of the plurality of objects, the degree of association based on a difference in feature value from the selected object with regard to the plurality of features; and
dividing the plurality of objects into a plurality of groups, wherein each group from the plurality of groups is based on the degree of association;
weighting each of the plurality of features; and
displaying each of the plurality of groups at a different position on the display device according to the degree of association of the selected object to the plurality of objects based on weightings of the plurality of features.

10. The computer program product according to claim 9, wherein said selecting selects, as the selected object, an object whose center on a display is closest to a position selected by the user.

11. The computer program product according to claim 9, wherein said selecting selects, as the selected object, an object displayed at a position selected by the user.

12. The computer program product according to claim 9, wherein the type is text, image, or graphics.

13. The method according to claim 1, further comprising:
receiving, by one or more processors, a pointer movement, wherein the pointer movement moves a pointer away from the selected object along a particular direction on the display; and
separating and displaying, by one or more processors, the groups from the plurality of groups along the particular direction on the display device based on the degree of association of selected object to the plurality of objects, wherein a first group having a high degree of association with the selected object is displayed closer to the selected object than a second group having a lower degree of association with the selected object relative to the first group.

14. The method according to claim 1, further comprising:
displaying, by one or more processors, each of the plurality of groups in separate regions of the display device, wherein distances of the separate regions from the one object are determined by differences in the plurality of features between the one object and other objects from the plurality of objects.

15. The computer program product according to claim 9, wherein said dividing into the plurality of groups comprises:
enabling the user to set a number of groups and a division index for group division.

16. The computer program product according to claim 9, wherein the method further comprises:
displaying a group region and an object for each of the plurality of groups.

17. A system comprising:
a processor, a computer readable memory, and a computer readable storage medium;
first program instructions to select one object from a plurality of objects displayed on a display device as a selected object, wherein said selecting is performed in response to a user performing an object selection operation; and
second program instructions to classify the plurality of objects, wherein classification of each of the plurality of objects is based on a degree of association with the selected object, and wherein said classifying the plurality of objects comprises:
reading a feature setting for computation of the degree of association;
specifying a plurality of features that are subject to the computation of the degree of association, wherein the plurality of features includes a creation date and time of an object, a display attribute of the object, an area of the object, a type of the object, and a distance of the object from the selected object;
computing, for each of the plurality of objects, the degree of association based on a difference in feature value from the selected object with regard to the plurality of features; and
dividing the plurality of objects into a plurality of groups, wherein each group from the plurality of groups is based on the degree of association;
third program instructions to weight each of the plurality of features; and
fourth program instructions to display each of the plurality of groups at a different position on the display device according to the degree of association of the selected object to the plurality of objects based on weightings of the plurality of features; and wherein
the first, second, third, and fourth program instructions are stored on the computer readable storage medium, and wherein the first and second program instructions are executed by the processor via the computer readable memory.

* * * * *